United States Patent
Fringant et al.

(10) Patent No.: US 8,969,491 B2
(45) Date of Patent: Mar. 3, 2015

(54) AQUEOUS DISPERSION

(75) Inventors: Christophe Fringant, Tavaux (FR);
Yves Vanderveken, Herverlee (BE);
Cedric Loubat, Vendargues (FR); Gilles Boutevin, Montpellier (FR)

(73) Assignee: Solvay SA, Brussels (BE)

( * ) Notice: Subject to any disclaimer, the term of this patent is extended or adjusted under 35 U.S.C. 154(b) by 1538 days.

(21) Appl. No.: 12/089,113

(22) PCT Filed: Oct. 4, 2006

(86) PCT No.: PCT/EP2006/067041
§ 371 (c)(1),
(2), (4) Date: Aug. 18, 2008

(87) PCT Pub. No.: WO2007/039626
PCT Pub. Date: Apr. 12, 2007

(65) Prior Publication Data
US 2009/0054583 A1    Feb. 26, 2009

(30) Foreign Application Priority Data

Oct. 5, 2005 (FR) ..................................... 05 10182

(51) Int. Cl.
| C08L 43/02 | (2006.01) |
| C08L 33/04 | (2006.01) |
| C08L 27/08 | (2006.01) |
| C09D 127/08 | (2006.01) |
| C08L 33/10 | (2006.01) |
| C08L 33/14 | (2006.01) |
| C08L 33/06 | (2006.01) |
| C08L 33/08 | (2006.01) |
| C08L 33/16 | (2006.01) |
| C09D 133/02 | (2006.01) |
| C09D 133/10 | (2006.01) |
| C09D 133/08 | (2006.01) |
| C09D 133/06 | (2006.01) |
| C09D 143/02 | (2006.01) |

(52) U.S. Cl.
CPC ............... *C08L 27/08* (2013.01); *C09D 127/08* (2013.01); *C08L 33/10* (2013.01); *C08L 33/14* (2013.01); *C08L 33/06* (2013.01); *C08L 33/08* (2013.01); *C08L 33/04* (2013.01); *C08L 33/16* (2013.01); *C08L 2666/04* (2013.01); *C09D 133/02* (2013.01); *C09D 133/10* (2013.01); *C09D 133/08* (2013.01); *C09D 133/064* (2013.01); *C09D 143/02* (2013.01); *C08L 33/062* (2013.01); *C08L 43/02* (2013.01)
USPC ........... 525/538; 524/501; 524/543; 524/550; 524/551; 427/331; 526/343

(58) Field of Classification Search
CPC ......... C08L 27/08; C08L 33/04; C08L 33/06; C08L 33/08; C08L 33/10; C08L 33/14; C08L 33/16; C08L 33/062; C08L 43/02; C08L 2666/04; C09D 127/08; C09D 133/02; C09D 133/08; C09D 133/10; C09D 133/062; C09D 133/064; C09D 143/02
USPC .................. 524/501, 543, 550, 551; 427/331; 525/538; 526/343
See application file for complete search history.

(56) References Cited

U.S. PATENT DOCUMENTS

| 6,218,456 | B1 | 4/2001 | Schlarb et al. |
| 6,740,173 | B1 | 5/2004 | Pouyfaucon et al. |
| 2005/0119386 | A1 | 6/2005 | Destarac et al. |
| 2007/0218207 | A1 * | 9/2007 | Fringant et al. ............... 427/331 |

FOREIGN PATENT DOCUMENTS

| EP | 0960889 A1 | 12/1999 | |
| FR | 2828685 A1 | 2/2003 | |
| FR | 2837208 A1 | 9/2003 | |
| WO | WO00/77101 A1 | 12/2000 | |
| WO | WO2005/028557 A1 | 3/2005 | |
| WO | WO 2005028557 A1 * | 3/2005 | ............... C08L 27/08 |

OTHER PUBLICATIONS

PCT International Search Report dated Dec. 28, 2006 for International Application No. PCT/EP2006/067041 (3 pp.).
PCT International Preliminary Report on Patentability dated Apr. 8, 2008 including the Written Opinion from ISA for International Application No. PCT/EP2006/067041 (6 pp.).
Preliminary Search Report dated Jul. 26, 2006 from the Institut National De La Propriete Industrielle for French Application No. FR 05.10182 (2 pp.).

(Continued)

*Primary Examiner* — Ling Choi
*Assistant Examiner* — David L Miller
(74) *Attorney, Agent, or Firm* — Oblon, McClelland, Maier & Neustadt, L.L.P.

(57) ABSTRACT

An aqueous dispersion containing a vinylidene chloride polymer (P1) containing vinylidene chloride in a proportion of at least 50% by weight, and at least one random, alternating or gradient copolymer (C1) having:

a) at least one monomer unit (m1) carrying at least one phosphonate group —PO(OH)(OR$_1$) with R$_1$ being a hydrogen atom or an alkyl radical comprising from 1 to 11 carbon atoms, and b) monomer units (m2) which represent at least 50% by weight of the copolymer (C1), derived from at least one monomer (M2) chosen from styrene, maleic anhydride, itaconic acid and the (meth)acrylic monomers corresponding to the general formula CH$_2$=CR$_2$R$_3$ in which R$_2$ and R$_3$ are described herein, copolymer (C1) not containing monomer units derived from vinylidene chloride.

17 Claims, No Drawings

(56) References Cited

OTHER PUBLICATIONS

Database CA [Online] Chemical Abstracts Service, Columbus, Ohio, US; Trinh, Anh Truc: "Study on the emulsion polymerization of acrylate monomers with the presence of organic phosphate for protective coating of carbon steel" XP002411737 retrieved from STN Database accession No. 140:255018 & TAP CHI HOA HOC, 41(1), 37-41 CODEN: TCHHDC; ISSN: 0378-2336, 2003 (Abstract only).

Rixens, B. et al., "Migration of Additives in Polymer Coatings: Phosphonated Additives and Poly(vinylidene chloride)-Based Matrix" Macromol. Chem. Phys, vol. 206, No. 14, pp. 1389-1398, Jul. 21, 2005, XP002392185, Wiley-VCH Verlag GmbH & Co., Weinheim (DE).

Bressy-Brondino, C. et al., "Adhesive and Anticorrosive Properties of Poly(vinylidene fluoride) Powders Blended with Phosphonated Copolymers on Galvanized Steel Plates", Journal of Applied Polymer Science, Jan. 2, 2002, vol. 83, pp. 22277-22287, John Wiley & Sons Inc.

* cited by examiner

AQUEOUS DISPERSION

This application is a 371 of PCT/EP06/67041 filed Oct. 4, 2006. This application also claims priority to French Application No. 05.10182, filed Oct. 5, 2005, the entirety of which is incorporated herein by reference.

The present invention relates to an aqueous dispersion, to a process for the preparation of such an aqueous dispersion, to its use in the coating of metal or polymer surfaces and to a process for the coating of such surfaces using the said aqueous dispersion.

The present invention comes within the context of the search for novel fields of application for vinylidene chloride polymers, in particular in the coating of metal or polymer surfaces.

In this context, Patent Application WO 2005/028557 discloses a polymer composition comprising a vinylidene chloride polymer and at least one additive which is a cooligomer comprising monomer units necessarily identical to those derived from the main monomer of this polymer (thus derived from vinylidene chloride) and monomer units derived from an ethylenically unsaturated monomer carrying at least one functional group. These additives exhibit the property of preferentially migrating to where they are of use (polymer/air surface, polymer/metal interface, and the like) and exhibit a satisfactory compatibility with the vinylidene chloride polymer. Thus, the composition obtained contributes the required properties in terms of adhesion and of surface properties of the coating.

The cooligomers involved in said composition nevertheless exhibit the great disadvantage of being complicated and therefore expansive to synthesize in so far as they are obtained from vinylidene chloride, which implies that the process which it is necessary to employ in order to prepare them has to be carried out under high pressure (generally of the order of 4 to 10 bar). Some of these copolymers also exhibit the disadvantage of being characterized by a block structure which is complicated to produce.

The need thus remains to find vinylidene chloride polymer compositions which, while retaining the advantages of the compositions described above, do not exhibit the disadvantages thereof.

The present invention relating to aqueous dispersions based on vinylidene chloride polymer comes within this context.

To this end, the invention relates to an aqueous dispersion comprising
1) at least one vinylidene chloride polymer (P1) and
2) at least one random, alternating or gradient copolymer (C1) comprising
   a) at least one monomer unit (m1) carrying at least one phosphonate group —PO(OH)(OR$_1$) with R$_1$ being a hydrogen atom or an alkyl radical comprising from 1 to 11 carbon atoms, and
   b) monomer units (m2) which represent at least 50% by weight of the copolymer (C1), derived from at least one monomer (M2) chosen from styrene, maleic anhydride, itaconic acid and the (meth)acrylic monomers corresponding to the general formula:

$$CH_2=CR_2R_3$$

in which R$_2$ is chosen from hydrogen and the methyl radical and R$_3$ is chosen from the —CN radical and the —CO—R$_4$ radical in which R$_4$ is chosen from the —OH radical, the —O—R$_5$ radicals with R$_5$ chosen from the linear or branched alkyl radicals comprising from 1 to 18 carbon atoms which optionally carry one or more —OH radicals, the epoxyalkyl radicals comprising from 2 to 10 carbon atoms and the alkoxyalkyl radicals comprising a total of 2 to 10 carbon atoms and finally 4 is also chosen from the —NR$_6$R$_7$ radicals in which R$_6$ and R$_7$, which are identical or different, are chosen from hydrogen and the alkyl radicals comprising from 1 to 10 carbon atoms which optionally carry one or more —OH radicals.

The term "aqueous dispersion" or also "latex" is intended to denote a stable dispersion of individual particles of polymers in water. The term "polymers" is intended to denote homopolymers and copolymers.

The individual particles of polymers present in the aqueous dispersion according to the invention are characterized by a size advantageously of between 50 and 5000 nm, preferably between 50 and 500 nm and particularly preferably between 90 and 350 nm.

The size of the individual particles of polymers can be measured according to any known technique; it is preferably measured by light scattering in a dilute dispersion using a Malvern Zetamaster device.

The term "at least one vinylidene chloride polymer (P1)" is intended to denote that the aqueous dispersion according to the invention must comprise at least one vinylidene chloride polymer (P1) but that it can comprise several of them. Preferably, it comprises just one of them.

The term "vinylidene chloride polymers (P1)" is intended to denote vinylidene chloride homopolymers and copolymers.

Among vinylidene chloride polymers, vinylidene chloride copolymers are preferred. The term "vinylidene chloride copolymers" is intended to denote the copolymers of vinylidene chloride, which is the predominant monomer, with one or more monomers which can be copolymerized with the latter. Vinylidene chloride is thus advantageously present in the resulting copolymers in a proportion of at least 50% by weight.

Mention may be made, among the monomers which can be copolymerized with vinylidene chloride, without implied limitation, of vinyl chloride, vinyl esters, such as, for example, vinyl acetate, vinyl ethers, acrylic acids, acrylic esters, acrylamides, methacrylic acids, methacrylic esters, methacrylamides, acrylonitrile, methacrylonitrile, styrene, styrene derivatives, butadiene, olefins, such as, for example, ethylene and propylene, itaconic acid and maleic anhydride but also copolymerizable surfactants, such as 2-acrylamido-2-methylpropanesulfonic acid (AMPS) or one of its salts, for example the sodium salt, and the acid 2-sulfoethyl methacrylate (2-SEM) or one of its salts, for example the sodium salt.

Vinylidene chloride copolymers which are particularly preferred are those comprising vinylidene chloride in a proportion of at least 50% by weight and, as copolymerizable monomers, vinyl chloride and/or of at least one monomer chosen from maleic anhydride, itaconic acid and the (meth) acrylic monomers corresponding to the general formula:

$$CH_2=CR_8R_9$$

in which R$_8$ is chosen from hydrogen and the methyl radical and R$_9$ is chosen from the —CN radical and the —CO—R$_{10}$ radical in which R$_{10}$ is chosen from the —OH radical, the —O—R$_{11}$ radicals with R$_{11}$ chosen from the linear or branched alkyl radicals comprising from 1 to 18 carbon atoms which optionally carry one or more —OH radicals, the epoxyalkyl radicals comprising from 2 to 10 carbon atoms and the alkoxyalkyl radicals comprising a total of 2 to 10 carbon atoms and finally R$_{10}$ is also chosen from the —NR$_{12}$R$_{13}$ radicals in which R$_{12}$ and R$_{13}$, which are identical or different, are chosen from hydrogen and the alkyl radicals comprising from 1 to 10 carbon atoms which optionally carry one or more —OH radicals.

The vinylidene chloride copolymers which are very particularly preferred are those comprising, as copolymerizable monomers, vinyl chloride and/or at least one monomer chosen from maleic anhydride, itaconic acid and the (meth)acrylic monomers which are methyl acrylate, methyl methacrylate, ethyl acrylate, ethyl methacrylate, n-butyl acrylate, n-butyl methacrylate, 2-ethylhexyl acrylate, 2-ethylhexyl methacrylate, 2-hydroxyethyl acrylate, 2-hydroxyethyl methacrylate, glycidyl methacrylate, glycidyl acrylate, acrylonitrile, methacrylonitrile, acrylic acid, methacrylic acid, acrylamide and N-methylolacrylamide.

Advantageously, the amount of vinylidene chloride in the vinylidene chloride copolymers varies from 50 to 95% by weight, preferably from 60 to 95% by weight and particularly preferably from 70 to 95% by weight.

Advantageously, the amount of vinyl chloride in the vinylidene chloride copolymers varies from 0.5 to 50% by weight, preferably from 0.5 to 40% by weight and particularly preferably from 0.5 to 30% by weight.

Advantageously, the amount of itaconic acid and/or of the (meth)acrylic monomer(s) in the vinylidene chloride copolymers varies from 1 to 50% by weight, preferably from 2 to 40% by weight and particularly preferably from 2 to 30% by weight.

The vinylidene chloride polymer (P1) according to the invention is advantageously characterized by a number-average molar mass, such as, for example, determined by steric exclusion chromatography or by elemental analysis, of greater than or equal to 30 000. The number-average molar mass of the polymer (P1) is advantageously less than or equal to 2 000 000, preferably less than or equal to 1 000 000, particularly preferably less than or equal to 500 000 and very particularly preferably less than or equal to 250 000.

The polymer (P1) is also advantageously characterized by a polydispersity index (ratio of the weight-average molar mass to the number-average molar mass), such as determined by steric exclusion chromatography, of greater than or equal to 1. The polymer (P1) is advantageously characterized by a polydispersity index of less than or equal to 4.

The vinylidene chloride polymer (P1) involved in the aqueous dispersion according to the invention is advantageously prepared by an aqueous dispersion radical polymerization process.

The term "aqueous dispersion radical polymerization" is intended to denote aqueous emulsion radical polymerization and aqueous microsuspension radical polymerization.

The term "aqueous emulsion radical polymerization" for the synthesis of the polymer (P1)" is intended to denote any radical polymerization process which is carried out in aqueous medium in the presence of emulsifying agents and radical initiators which are soluble in water (conventional process).

The term "aqueous microsuspension polymerization", also known as "homogenized aqueous dispersion polymerization" or "miniemulsion aqueous dispersion polymerization", is intended to denote any radical polymerization process in which fat-soluble initiators are employed and an emulsion of droplets of monomers is produced by virtue of powerful mechanical stirring and the presence of emulsifying agents.

The vinylidene chloride polymer (P1) involved in the aqueous dispersion according to the invention is preferably prepared by an aqueous emulsion radical polymerization process, giving rise to the formation of an aqueous dispersion or latex.

The polymer (P1) is thus with advantage in the form of an aqueous dispersion or latex and is preferably used in this form in the preparation of the aqueous dispersion according to the invention.

The term "at least one random, alternating or gradient copolymer (C1)" is intended to denote that the aqueous dispersion according to the invention must comprise at least one copolymer (C1) but that it can comprise several of them. Preferably, it comprises just one of them.

The term "copolymer (C1)" is intended to denote the product resulting from the copolymerization, that is to say optionally a blend of copolymers (C1) of different fine structure. The copolymer (C1) within the meaning of the invention is thus advantageously the mean product resulting from the polymerization.

The aqueous dispersion according to the invention consequently preferably comprises just one vinylidene chloride polymer (P1) and just one random, alternating or gradient copolymer (C1).

The copolymer (C1) according to the invention is characterized by a number-average molar mass, such as, for example, determined by steric exclusion chromatography or by elemental analysis, advantageously of greater than or equal to 100, preferably of greater than or equal to 1000, particularly preferably of greater than or equal to 10 000, very particularly preferably of greater than or equal to 15 000 and truly very particularly preferably of greater than or equal to 18 000. The number-average molar mass of the copolymer (C1) is advantageously less than or equal to 2 000 000, preferably less than or equal to 1 000 000, particularly preferably less than or equal to 750 000, very particularly preferably less than or equal to 300 000 and truly very particularly preferably less than or equal to 50 000. Good results have been obtained with a number-average molar mass of the copolymer (C1) of less than or equal to 30 000.

The copolymer (C1) is also advantageously characterized by a polydispersity index (ratio of the weight-average molar mass to the number-average molar mass), such as determined by steric exclusion chromatography, of greater than or equal to 1. The copolymer (C1) is advantageously characterized by a polydispersity index of less than or equal to 4, preferably of less than or equal to 3.5, particularly preferably of less than or equal to 3 and very particularly preferably of less than or equal to 2.5.

The linking of the monomer units in the copolymer (C1) is of random, alternating or gradient type, preferably of random or gradient type and particularly preferably of random type. The copolymer (C1) is not advantageously a copolymer in which the linking of the monomer units is of block type.

The term "copolymer arranged in a random structure" is intended to denote a copolymer in which the distribution of the monomers all along the chain is random and the proportion of which is statistically the same all along the chain. By way of illustration, the following scheme illustrates a representation, among others, of such a copolymer comprising the monomers A and B: AABAAABBABBBAAB.

The term "copolymer arranged in an alternating structure" is intended to denote a copolymer in which the monomers composing the copolymer are linked together alternately all along the chain. By way of illustration, the following scheme illustrates the representation, among others, of such a copolymer comprising the monomers A and B: ABABABABABABAB.

The term "copolymer arranged in a block structure" is intended to denote a copolymer in which a linking of more or less lengthy sequences formed of the same monomer or monomers is observed. By way of illustration, the following scheme illustrates a representation, among others, of such a copolymer comprising the monomers A and B: AAAAAAAABBBBBBBB.

The term "copolymer arranged in a gradient structure" is intended to denote a copolymer composed of at least two monomers in which the relative proportion of one monomer with respect to the other(s) increases or decreases all along the chain. By way of illustration, the following scheme illustrates a representation, among others, of such a copolymer comprising the monomers A and B: AAABAABBABBBBB.

The copolymer (C1) can have any structure but the structure is preferably essentially linear. The term "essentially linear" is intended to denote that the structure of the copolymer (C1) can exhibit a few irregularities in its linearity due, for example, to small branchings.

The copolymer (C1) is advantageously characterized by an essentially linear structure with linking of the monomer units of random or gradient type and preferably by an essentially linear structure with linking of the monomer units of random type.

The copolymer (C1) comprises at least one monomer unit (m1) carrying at least one phosphonate group —PO(OH)(OR$_1$) with R$_1$ being a hydrogen atom or an alkyl radical comprising from 1 to 11 carbon atoms.

The term "phosphonate group —PO(OH)(OR$_1$)" is intended to denote the —PO(OH)(OR$_1$) groups attached to the carbon atom and not the phosphate groups —O—P(O)(OR)$_2$ with R being an hydrogen atom or an alkyl radical in which the phosphorus atom is attached to an oxygen atom.

The monomer unit (m1) carrying at least one phosphonate group can be derived from an ethylenically unsaturated monomer (M1) itself carrying at least one phosphonate group —PO(OH)(OR$_1$) with R$_1$ being a hydrogen atom or an alkyl radical comprising from 1 to 11 carbon atoms but also from an ethylenically unsaturated monomer (M1') carrying at least one —PO(OR$_{1'}$)(OR$_{2'}$) group with R$_{1'}$ and R$_{2'}$, which are identical or different, representing an alkyl radical comprising from 1 to 11 carbon atoms which, after total or partial cleavage, results in the phosphonate group —PO(OH)(OR$_1$).

The term "cleavage" is understood to mean any reaction which makes it possible to obtain the phosphonate groups —PO(OH)(OR$_1$). The hydrolysis reaction is a preferred case of cleavage.

Total cleavage (in which R$_1$ is an hydrogen atom) or partial cleavage, in particular hemihydrolysis (in which R$_1$ is an alkyl radical comprising from 1 to 11 carbon atoms), of the ethylenically unsaturated monomer (M1') can be carried out as described respectively in C. Brondino, B. Boutevin, Y. Hervaud, N. Pelaprat & A. Manseri, J. Fluorine Chem., 1996, 76, 193, and B. Boutevin, Y. Hervaud, T. Jeanmaire, A. Boulahna, M. Elasri, Phosph. Sulfur and Silicon, 2001, 174, 1.

Total or partial cleavage advantageously takes place during the synthesis of the copolymer (C1), preferably on the copolymer (C1) synthesized starting from the monomer (M1').

When the monomer unit (m1) carrying at least one phosphonate group is derived from an ethylenically unsaturated monomer (M1) itself carrying at least one phosphonate group —PO(OH)(OR$_1$) and when thus the copolymer (C1) is synthesized starting from at least one monomer (M1), the latter can optionally have been obtained by total or partial cleavage of the corresponding monomer (M1') before the synthesis of the copolymer (C1).

The copolymer (C1) comprises at least one monomer unit (m1). Preferably, the monomer units (m1) of the copolymer (C1) represent at least 0.5% by weight, particularly preferably at least 1% by weight and very particularly preferably at least 2% by weight, with respect to the total weight of the monomer units in the copolymer (C1).

Advantageously, the monomer units (m1) represent at most 50% by weight, preferably at most 45% by weight, particularly preferably at most 40% by weight and very particularly preferably at most 30% by weight, with respect to the total weight of the monomer units in the copolymer (C1).

A copolymer (C1) in which the monomer units (m1) represent at least 0.5% by weight and at most 50% by weight with respect to the total weight of the monomer units in the copolymer (C1) is very particularly advantageous.

Advantageously, the monomer unit (m1) carrying at least one phosphonate group —PO(OH)(OR$_1$) is derived from an ethylenically unsaturated monomer (M1) chosen from the following monomers:

$CH_2=CR_{14}$—CO—O—$(CH_2)_i$—PO(OH)(OR$_1$) with R$_{14}$ being a hydrogen atom or a methyl radical and i between 1 and 20, $CH_2=CR_{14}$—CO—O—$(CH_2)_i$—O—CO—$(CH_2)_{10}$—PO(OH)(OR$_1$) with R$_{14}$ being a hydrogen atom or a methyl radical and i between 1 and 20, $CH_2=CR_{14}$—CO—O—$CH_2$—$C(CH_3)$(OH)—PO(OH)(OR$_1$) with R$_{14}$ being a hydrogen atom or a methyl radical, $CH_2=CR_{14}$—CO—O—NH—CO—O—$(CH_2)_i$—PO(OH)(OR$_1$) with R$_{14}$ being a hydrogen atom or a methyl radical and i between 1 and 20, $CH_2=CR_{14}$—CO—O—$CH_2$—$CH_2$—NH—CO—O—$(CH_2)_i$—PO(OH)(OR$_1$) with R$_{14}$ being a hydrogen atom or a methyl radical and i between 1 and 20, $CH_2=CR_{14}$—CO—O—$(CH_2)_i$—N(C—$(CH_3)_3$)—$CH_2$—PO(OH)(OR$_1$) with R$_{14}$ being a hydrogen atom or a methyl radical and i between 1 and 20, $CH_2=CR_{14}$—CO—O—$(CH_2)_i$—O—CO—$(CH_2)_{10}$—N($CH_2$—PO(OH)(OR$_1$))$_2$ with R$_{14}$ being a hydrogen atom or a methyl radical and i between 1 and 20, $CH_2=CR_{14}$—CO—O—$(CH_2)_5$—N($CH_2$—PO(OH)(OR$_1$))$_2$ with R$_{14}$ being a hydrogen atom or a methyl radical, $CH_2=CR_{14}$—$C_6H_4$—$C(CH_3)_2$—NH—CO—O—$(CH_2)_i$—PO(OH)(OR$_1$) with R$_{14}$ being a hydrogen atom or a methyl radical and i between 1 and 20, $CH_2=CH$—$C_6H_4$—$CH_2$—PO(OH)(OR$_1$) with the substitution of the aromatic nucleus being a mixture of ortho and para, $CH_2=CH$—PO(OH)(OR$_1$), and the corresponding monomers (M1') carrying at least one —PO(OR$_{1'}$)(OR$_{2'}$) group with R$_{1'}$ and R$_{2'}$, which are identical or different, representing an alkyl radical comprising from 1 to 11 carbon atoms which, after total cleavage or partial cleavage (in particular hemihydrolysis), results in the phosphonate group —PO(OH)(OR$_1$) with R$_1$ being a hydrogen atom or an alkyl radical comprising from 1 to 11 carbon atoms.

In the formulae mentioned above, i is advantageously between 1 and 20, preferably between 1 and 11 and particularly preferably between 1 and 3.

In the monomer unit (m1) carrying at least one —PO(OH)(OR$_1$) group, R$_1$ is a hydrogen atom or an alkyl radical comprising from 1 to 11 carbon atoms.

When R$_1$ is an alkyl radical, R$_1$ advantageously comprises from 1 to 11 carbon atoms, preferably from 1 to 8 carbon atoms and particularly preferably from 1 to 5. The cases where R$_1$ is either a methyl radical or an ethyl radical are very particularly preferred.

Preferably, the monomer unit (m1) carrying at least one phosphonate group —PO(OH)(OR$_1$) is derived from an ethylenically unsaturated monomer (M1) chosen from the following monomers:

$CH_2=CR_{14}$—CO—O—$(CH_2)_i$—PO(OH)($OR_1$) with $R_{14}$ being a hydrogen atom or a methyl radical and i between 1 and 20, $CH_2=CR_{14}$—CO—O—$(CH_2)_i$—O—CO—$(CH_2)_{10}$—PO(OH)($OR_1$) with $R_{14}$ being a hydrogen atom or a methyl radical and i between 1 and 20, $CH_2=CR_{14}$—CO—O—$CH_2$—C($CH_3$)(OH)—PO(OH)($OR_1$) with $R_{14}$ being a hydrogen atom or a methyl radical, $CH_2=CR_{14}$—CO—O—NH—CO—O—$(CH_2)_i$—PO(OH)($OR_1$) with $R_{14}$ being a hydrogen atom or a methyl radical and i between 1 and 20, $CH_2=CR_{14}$—CO—O—$CH_2$—$CH_2$—NH—CO—O—$(CH_2)_i$—PO(OH)($OR_1$) with $R_{14}$ being a hydrogen atom or a methyl radical and i between 1 and 20, $CH_2=CR_{14}$—CO—O—$(CH_2)_i$—N(C—$(CH_3)_3$)—$CH_2$—PO(OH)($OR_1$) with $R_{14}$ being a hydrogen atom or a methyl radical and i between 1 and 20, $CH_2=CR_{14}$—CO—O—$(CH_2)_i$—O—CO—$(CH_2)_{10}$—N($CH_2$—PO(OH)($OR_1$))$_2$ with $R_{14}$ being a hydrogen atom or a methyl radical and i between 1 and 20, $CH_2=CR_{14}$—CO—O—$(CH_2)_5$—N($CH_2$—PO(OH)($OR_1$))$_2$ with $R_{14}$ being a hydrogen atom or a methyl radical, $CH_2=CH$—PO(OH)($OR_1$), and the corresponding monomers (M1') carrying at least one —PO($OR_{1'}$)($OR_{2'}$) group with $R_{1'}$ and $R_{2'}$, which are identical or different, representing an alkyl radical comprising from 1 to 11 carbon atoms which, after total cleavage or partial cleavage (in particular hemihydrolysis), results in the phosphonate group —PO(OH)($OR_1$) with $R_1$ being a hydrogen atom or an alkyl radical comprising from 1 to 11 carbon atoms.

The preferences mentioned above for i and $R_1$ are also applicable for this preferred form.

Particularly preferably, the monomer unit (m1) carrying at least one phosphonate group —PO(OH)($OR_1$) is derived from an ethylenically unsaturated monomer (M1) chosen from the following monomers:

$CH_2=CR_{14}$—CO—O—$(CH_2)_i$—PO(OH)($OR_1$) with $R_{14}$ being a hydrogen atom or a methyl radical and i between 1 and 20, $CH_2=CR_{14}$—CO—O—$CH_2$—C($CH_3$)(OH)—PO(OH)($OR_1$) with $R_{14}$ being a hydrogen atom or a methyl radical, $CH_2=CR_{14}$—CO—O—NH—CO—O—$(CH_2)_i$—PO(OH)($OR_1$) with $R_{14}$ being a hydrogen atom or a methyl radical and i between 1 and 20, $CH_2=CR_{14}$—CO—O—$CH_2$—$CH_2$—NH—CO—O—$(CH_2)_i$—PO(OH)($OR_1$) with $R_{14}$ being a hydrogen atom or a methyl radical and i between 1 and 20, $CH_2=CR_{14}$—CO—O—$(CH_2)_i$—N(C—$(CH_3)_3$)—$CH_2$—PO(OH)($OR_1$) with $R_{14}$ being a hydrogen atom or a methyl radical and i between 1 and 20, $CH_2=CR_{14}$—CO—O—$(CH_2)_5$—N($CH_2$—PO(OH)($OR_1$))$_2$ with $R_{14}$ being a hydrogen atom or a methyl radical, $CH_2=CH$—PO(OH)($OR_1$), and the corresponding monomers (M1') carrying at least one —PO($OR_{1'}$)($OR_{2'}$) group with $R_{1'}$ and $R_{2'}$, which are identical or different, representing an alkyl radical comprising from 1 to 11 carbon atoms which, after total cleavage or partial cleavage (in particular hemihydrolysis), results in the phosphonate group —PO(OH)($OR_1$) with $R_1$ being a hydrogen atom or an alkyl radical comprising from 1 to 11 carbon atoms.

The preferences mentioned above for i and $R_1$ are also applicable for this particularly preferred form.

Very particularly preferably, the monomer unit (m1) carrying at least one phosphonate group —PO(OH)($OR_1$) is derived from an ethylenically unsaturated monomer (M1) chosen from the following monomers:

$CH_2=C(CH_3)$—CO—O—$CH_2$—PO(OH)($OR_1$)

$CH_2=C(CH_3)$—CO—O—$(CH_2)_2$—PO(OH)($OR_1$)

$CH_2=C(CH_3)$—CO—O—$CH_2$—C($CH_3$)(OH)—PO(OH)($OR_1$)

$CH_2=C(CH_3)$—CO—O—NH—CO—O—$CH_2$—PO(OH)($OR_1$)

$CH_2=C(CH_3)$—CO—O—NH—CO—O—$(CH_2)_2$—PO(OH)($OR_1$)

$CH_2=C(CH_3)$—CO—O—$CH_2$—$CH_2$—NH—CO—O—$CH_2$—PO(OH)($OR_1$)

$CH_2=C(CH_3)$—CO—O—$CH_2$—$CH_2$—NH—CO—O—$(CH_2)_2$—PO(OH)($OR_1$)

$CH_2=C(CH_3)$—CO—O—$CH_2$—$CH_2$—N(C—$(CH_3)_3$)—$CH_2$—PO(OH)($OR_1$)

$CH_2=C(CH_3)$—CO—O—$(CH_2)_5$—N($CH_2$—PO(OH)($OR_1$))$_2$ $CH_2=CH$—PO(OH)($OR_1$), and the corresponding monomers (M1') carrying at least one —PO($OR_{1'}$)($OR_{2'}$) group with $R_{1'}$ and $R_{2'}$ identical and representing an alkyl radical comprising 1 or 2 carbon atoms which, after cleavage, results in the phosphonate group —PO(OH)($OR_1$) with $R_1$ being a hydrogen atom or an alkyl radical comprising 1 or 2 carbon atoms.

Truly very particularly preferably, the monomer unit (m1) carrying at least one phosphonate group —PO(OH)($OR_1$) is derived from an ethylenically unsaturated monomer (M1) chosen from the following monomers $CH_2=C(CH_3)$—CO—O—$CH_2$—PO(OH)($OR_1$)

$CH_2=C(CH_3)$—CO—O—$CH_2$—C($CH_3$)(OH)—PO(OH)($OR_1$)

$CH_2=C(CH_3)$—CO—O—NH—CO—O—$(CH_2)_2$—PO(OH)($OR_1$)

$CH_2=C(CH_3)$—CO—O—$CH_2$—$CH_2$—NH—CO—O—$(CH_2)_2$—PO(OH)($OR_1$)

$CH_2=C(CH_3)$—CO—O—$CH_2$—$CH_2$—N(C—$(CH_3)_3$)—$CH_2$—PO(OH)($OR_1$)

$CH_2=CH$—PO(OH)($OR_1$), and the corresponding monomers (M1') carrying at least one —PO($OR_{1'}$)($OR_{2'}$) group with $R_{1'}$ and $R_{2'}$ identical and representing an alkyl radical comprising 1 or 2 carbon atoms which, after cleavage, results in the phosphonate group —PO(OH)($OR_1$) with $R_1$ being a hydrogen atom or an alkyl radical comprising 1 or 2 carbon atoms.

Among those last cited monomers, $CH_2=CH$—PO(OH)($OR_1$), and the corresponding monomers (M1') carrying at least one —PO($OR_{1'}$)($OR_{2'}$) group with $R_{1'}$ and $R_{2'}$ identical and representing an alkyl radical comprising 1 or 2 carbon atoms which, after cleavage, results in the phosphonate group —PO(OH)($OR_1$) with $R_1$ being a hydrogen atom or an alkyl radical comprising 1 or 2 carbon atoms, present a particular interest due to their commercial availability.

The copolymer (C1) comprises monomer units (m2) which represent at least 50% by weight of the copolymer (C1), derived from at least one monomer (M2) chosen from styrene, maleic anhydride, itaconic acid and the (meth)acrylic monomers corresponding to the general formula:

$$CH_2=CR_2R_3$$

in which $R_2$ is chosen from hydrogen and the methyl radical and $R_3$ is chosen from the —CN radical and the —CO—$R_4$ radical in which $R_4$ is chosen from the —OH radical, the —O—$R_5$ radicals with $R_5$ chosen from the linear or branched alkyl radicals comprising from 1 to 18 carbon atoms which optionally carry one or more —OH radicals, the epoxyalkyl radicals comprising from 2 to 10 carbon atoms and the alkoxyalkyl radicals comprising a total of 2 to 10 carbon atoms and finally $R_4$ is also chosen from the $—NR_6R_7$ radicals in which $R_6$ and $R_7$, which are identical or different, are chosen from hydrogen and the alkyl radicals comprising from 1 to 10 carbon atoms which optionally carry one or more —OH radicals.

Preferably, the copolymer (C1) comprises monomer units (m2) which represent at least 50% by weight of the copolymer (C1), derived from at least one monomer (M2) chosen from maleic anhydride, itaconic acid and the (meth)acrylic monomers corresponding to the general formula:

$$CH_2=CR_2R_3$$

in which $R_2$ is chosen from hydrogen and the methyl radical and $R_3$ is chosen from the —CN radical and the $—CO—R_4$ radical in which $R_4$ is chosen from the —OH radical and the $—O—R_5$ radicals with $R_5$ chosen from the linear or branched alkyl radicals comprising from 1 to 18 carbon atoms which optionally carry one or more —OH radicals and the epoxyalkyl radicals comprising from 2 to 10 carbon atoms and finally $R_4$ is also chosen from the $—NR_6R_7$ radicals in which $R_6$ and $R_7$, which are identical or different, are chosen from hydrogen and the alkyl radicals comprising from 1 to 10 carbon atoms which optionally carry one or more —OH radicals.

Particularly preferably, the copolymer (C1) comprises monomer units (m2) which represent at least 50% by weight of the copolymer (C1), derived from at least one monomer (M2) chosen from maleic anhydride, itaconic acid and the (meth)acrylic monomers corresponding to the general formula:

$$CH_2=CR_2R_3$$

in which $R_2$ is chosen from hydrogen and the methyl radical and $R_3$ is chosen from the —CN radical and the $—CO—R_4$ radical in which $R_4$ is chosen from the —OH radical and the $—O—R_5$ radicals with $R_5$ chosen from the linear or branched alkyl radicals comprising from 1 to 18 carbon atoms which optionally carry one or more —OH radicals and the epoxyalkyl radicals comprising from 2 to 10 carbon atoms.

Very particularly preferably, the copolymer (C1) comprises monomer units (m2) which represent at least 50% by weight of the copolymer (C1), derived from at least one monomer (M2) chosen from maleic anhydride, itaconic acid and the (meth)acrylic monomers corresponding to the general formula:

$$CH_2=CR_2R_3$$

in which $R_2$ is chosen from hydrogen and the methyl radical and $R_3$ is chosen from the $—CO—R_4$ radical in which $R_4$ is chosen from the —OH radical and the $—O—R_5$ radicals with $R_5$ chosen from the linear or branched alkyl radicals comprising from 1 to 18 carbon atoms which optionally carry one or more —OH radicals and the epoxyalkyl radicals comprising from 2 to 10 carbon atoms.

Truly very particularly preferably, the copolymer (C1) comprises monomer units (m2) which represent at least 50% by weight of the copolymer (C1), derived from at least one monomer (M2) chosen from maleic anhydride, itaconic acid and the (meth)acrylic monomers corresponding to the general formula:

$$CH_2=CR_2R_3$$

in which $R_2$ is chosen from hydrogen and the methyl radical and $R_3$ is chosen from the $—CO—R_4$ radical in which $R_4$ is chosen from the —OH radical and the $—O—R_5$ radicals with $R_5$ chosen from the linear or branched alkyl radicals comprising from 1 to 8 carbon atoms which optionally carry one or more —OH radicals and the epoxyalkyl radicals comprising from 2 to 5 carbon atoms.

According to a particularly preferred variant, the copolymer (C1) comprises monomer units (m2) which represent at least 50% by weight of the copolymer (C1), derived from at least one monomer (M2) chosen from maleic anhydride, itaconic acid, methyl methacrylate, methyl acrylate, ethyl methacrylate, ethyl acrylate, n-butyl methacrylate, n-butyl acrylate, 2-ethylhexyl methacrylate, 2-ethylhexyl acrylate, 2-hydroxyethyl methacrylate, 2-hydroxyethyl acrylate, glycidyl methacrylate, glycidyl acrylate, methacrylic acid and acrylic acid.

The term "monomer units (m2) derived from at least one monomer (M2)" is intended to denote that the monomer units (m2) can be derived from the same monomer (M2) or from several different monomers (M2). For instance, in this last case, the monomer units (m2) can be derived from two or from more than two different monomers (M2). The monomer units (m2) can thus be derived from every combination of above-mentioned monomers (M2). Monomer units (m2) derived from methyl methacrylate and n-butyl acrylate or from methyl methacrylate and 2-ethylhexyl acrylate are some examples among others.

The monomer units (m2) derived from the monomer (M2) represent at least 50% by weight, preferably at least 55% by weight, particularly preferably at least 60% by weight and very particularly preferably at least 70% by weight of the copolymer (C1).

Advantageously, the monomer units (m2) derived from the monomer (M2) represent at most 99.5% by weight, preferably at most 99% by weight and particularly preferably at most 98% by weight of the copolymer (C1).

A copolymer (C1) in which the monomer units (m2) represent at least 50% by weight and at most 99.5% by weight of the copolymer (C1) is very particularly preferred.

Any copolymer (C1) comprising
a) at least one monomer unit (m1), whatever the preference with regard to the nature of the monomer units (m1) and/or with regard to their amount described in detail above, and
b) the monomer units (m2) derived from at least one monomer (M2), whatever the preference with regard to the nature of the monomer units (m2) and/or with regard to their amount described in detail above,
contributes a great advantage to the dispersion according to the invention.

In other words, any combination of the preferences mentioned above with regard to the nature and/or to the amount of the monomer units (m1) and of the monomer units (m2) of the copolymer (C1) is advantageous for the dispersion according to the invention.

A copolymer (C1) comprising
a) monomer units (m1), in a proportion of at least 0.5% and at most 50% by weight of the copolymer (C1), carrying at least one phosphonate group $—PO(OH)(OR_1)$ and derived from an ethylenically unsaturated monomer (M1) chosen from the following monomers:

$CH_2=C(CH_3)—CO—O—CH_2—PO(OH)(OR_1)$
$CH_2=C(CH_3)—CO—O—CH_2—C(CH_3)(OH)—PO(OH)(OR_1)$
$CH_2=C(CH_3)—CO—O—NH—CO—O—(CH_2)_2—PO(OH)(OR_1)$
$CH_2=C(CH_3)—CO—O—CH_2—CH_2—NH—CO—O—(CH_2)_2—PO(OH)(OR_1)$
$CH_2=C(CH_3)—CO—O—CH_2—CH_2—N(C—(CH_3)_3)—CH_2—PO(OH)(OR_1)$
$CH_2=CH—PO(OH)(OR_1)$, and the corresponding monomers (M1') carrying at least one —PO(OR$_{1'}$)(OR$_{2'}$) group with R$_{1'}$ and R$_{2'}$ identical and representing an alkyl radical comprising 1 or 2 carbon atoms which, after cleavage, results in the phosphonate group —PO(OH)(OR$_1$) with R$_1$ being a hydrogen atom or an alkyl radical comprising 1 or 2 carbon atoms; and b) monomer units (m2), in a proportion of at least 50% by weight and of at most 99.5% by weight of the copolymer (C1), derived from at least one monomer (M2) chosen from maleic anhydride, itaconic acid, methyl methacrylate, methyl acrylate, ethyl methacrylate, ethyl acrylate, n-butyl methacrylate, n-butyl acrylate, 2-ethylhexyl methacrylate, 2-ethylhexyl acrylate, 2-hydroxyethyl methacrylate, 2-hydroxyethyl acrylate, glycidyl methacrylate, glycidyl acrylate, methacrylic acid and acrylic acid, is preferred for the aqueous dispersion according to the invention.

In addition of monomer units (m1) and (m2), the copolymer (C1) can optionally comprise additionally other monomer units different from monomer units (m1) and (m2) and from monomer units derived from vinylidene chloride (as copolymers obtained from vinylidene chloride present several disadvantages as previously mentioned). Preferably, the copolymer (C1) consists of monomer units (m1) and (m2). It comprises therefore preferably no other monomer units than monomer units (m1) and (m2).

The copolymer (C1) involved in the aqueous dispersion according to the invention can be prepared by any radical polymerization process. It is preferably prepared by an aqueous emulsion radical polymerization process or by a solution radical polymerization process in a solvent.

The term "aqueous emulsion radical polymerization" for the synthesis of the copolymer (C1)" is intended to denote any radical polymerization process which is carried out in an aqueous medium in the presence of emulsifying agents and of radical initiators which are soluble in water, that is to say the conventional aqueous emulsion radical polymerization process but also any controlled aqueous emulsion radical polymerization process (in particular the ITP (Iodine Transfer Polymerization) process).

When the copolymer (C1) involved in the aqueous dispersion according to the invention is prepared by an aqueous emulsion radical polymerization process, an aqueous dispersion or latex is advantageously obtained.

In this case, the copolymer (C1) is with advantage in the form of an aqueous dispersion or latex and is preferably used in this form in the preparation of the aqueous dispersion according to the invention.

The term "solution radical polymerization in a solvent" is intended to denote homogeneous radical polymerization (copolymer soluble in the solvent) or heterogeneous radical polymerization (copolymer insoluble in the solvent) in an organic solvent, such as, for example, toluene, xylene, dioxane, methyl ethyl ketone, alcohols, such as butanol, and acetone.

When the copolymer (C1) involved in the aqueous dispersion according to the invention is prepared by a homogeneous radical polymerization process in a solvent, it is advantageously obtained in the form of a homogeneous solution and is preferably subsequently emulsified in water in the presence of an emulsifying agent to give rise to the formation of an aqueous dispersion or latex. If purification of the copolymer (C1) proves to be necessary or if the hydrolysis of the copolymer (C1) requires extracting it from the polymerization solvent, the copolymer can advantageously be isolated in the form of a solid and, after purification, it is then preferably dissolved in the solvent and then emulsified in water to give rise to the formation of an aqueous dispersion or latex.

When the copolymer (C1) involved in the aqueous dispersion according to the invention is prepared by a heterogeneous radical polymerization process in a solvent, it is advantageously obtained in the form of a solid which is preferably subsequently dissolved in a solvent and then emulsified in water to give rise to the formation of an aqueous dispersion or latex.

In this case, the copolymer (C1) is with advantage in the form of an aqueous dispersion or latex and is preferably used in this form in the preparation of the aqueous dispersion according to the invention.

The aqueous dispersion according to the invention advantageously comprises at least 50% by weight, preferably at least 60% by weight, very particularly preferably at least 65% by weight and indeed very particularly preferably at least 70% by weight of polymer (P1), with respect to the total weight of polymer (P1) and of copolymer (C1). The aqueous dispersions comprising at least 80% by weight, indeed even at least 90% by weight, of polymer (P1) are particularly advantageous economically.

The aqueous dispersion according to the invention can additionally comprise standard additives, such as dyes, stabilizing agents, fillers, coalescence agents, defoaming agents, waxes, additives for improving flame retardancy, inorganic or organic pigmentation additives and wetting agents and any other additive known to a person skilled in the art for being suitable for the application.

Subsequently, the subject-matter of the present invention is a process for the preparation of the aqueous dispersion according to the invention.

To this end, the invention relates to a process for the preparation of an aqueous dispersion according to the invention comprising the mixing of an aqueous dispersion of at least one vinylidene chloride polymer (P1) and of an aqueous dispersion of at least one random, alternating or gradient copolymer (C1) as defined above.

Preferably, the invention consequently also relates to an aqueous dispersion comprising the mixture of an aqueous dispersion of at least one vinylidene chloride polymer (P1) and of an aqueous dispersion of at least one random, alternating or gradient copolymer (C1) as defined above.

Furthermore, the subject-matter of the present invention is the use of the aqueous dispersion according to the invention.

To this end, the invention relates to the use of the aqueous dispersion according to the invention in the coating of metal or polymer surfaces, preferably in the coating of metal surfaces.

The term "metal surfaces" is intended to denote the surfaces of metal-base materials.

The term "metal" is intended to denote any substance which is distinguished from non-metal surfaces by a high electrical conductivity and a high thermal conductivity, this conductivity decreasing with an increase in temperature, and by their high reflectivity with regard to light, which gives them a characteristic metallic lustre.

Mention may be made, as preferred metal-base materials, of aluminium, zinc, tin, copper, copper alloys, such as bronze or brass, iron, steel, which is optionally stainless, galvanized steel or silver, with a very particular preference for aluminium, steel, which is often stainless, and galvanized steel.

Mention may be made, as polymer surfaces, of poly(ethylene terephthalate), bioriented polypropylene, poly(vinyl chloride), polyethylene, polyamides and EVA (copolymer of ethylene and of vinyl acetate which is partially hydrolysed).

Another subject-matter of the present invention is a process for the coating of surfaces as mentioned above using aqueous dispersion according to the invention.

To this end, the invention relates to a process for the coating of metal or polymer surfaces, preferably metal surfaces, using the aqueous dispersion according to the invention, according to which the aqueous dispersion is coated onto the said surfaces.

The aqueous dispersion is advantageously coated onto the said surfaces by any conventional coating or spray coating process or by immersion of the surface in the aqueous dispersion. The coating stage is preferably followed by a stage of evaporation of the water.

There are numerous advantages to the aqueous dispersion according to the invention. Thus, it makes it possible to improve adhesion of a polymer coating to a surface, in particular to a metal surface. Furthermore, the aqueous dispersion according to the invention exhibits the great advantage of resorting to copolymers which are simple in their structure but also in the way in which they are synthesized and thus which have an entirely acceptable cost contrary to vinylidene chloride based copolymers or to block type copolymers.

The aqueous dispersion according to the invention might consequently be of advantage in the field of corrosion-resistant coatings and paints in aqueous phase.

A paint is a fluid preparation (liquid, pasty or powdery) which, after coating in thin layer on a support, gives a thin film, opaque and adherent, protector and/or decorative. One speaks about paints in aqueous phase if water is used for dilution.

Compared to paints based on solvent (organic solvent), paints in aqueous phase show the advantages of reducing the rate of used volatile organic compounds and of therefore answering to recent in force European legislations.

Compared to paints based on solvent which would comprise at least one polymer (P1) and at least one copolymer (C1) such as defined for the aqueous dispersions according to the invention, even if intrinsically the latter would be characterized by a less good homogeneity of its components than in an organic solvent, the aqueous dispersions according to the invention lead unexpectedly to a very good adhesion of the polymer coating to surfaces, in particular to metal surfaces.

The examples which follow are intended to illustrate the invention without, however, limiting the scope thereof.

Adhesion Test

Adhesion tests were carried out according to a protocol derived from Standard ISO 2409. The test was carried out under ambient temperature and humidity conditions.

A film was formed on a metal surface by deposition of the aqueous dispersion using an applicator having a slot of 100 microns. The metal surface is a standardized steel sheet for adhesion tests (referred to as Q panels). The water was subsequently evaporated during the drying of the film at ambient temperature (above the film-forming temperature of PVDC).

The film obtained was incised using a standardized cutter comprising 6 blades separated by 1 mm, so as to obtain incisions forming a uniform lattice pattern, as recommended in the standard. A piece of standardized adhesive (25 mm in width, adhesive strength 10 N +/−1) was applied to the cut surface and, after manually pulling off the adhesive, the coating was brushed with a soft brush and the appearance of the vinylidene chloride polymer coating was examined in order to assess the quality of the adhesion. The presence of lustrous areas (number, size) in the polymer film along the incisions made it possible to quantify the quality of the adhesion.

The adhesion was rated via a scale from 0 to 5; the value of 0 corresponding to perfect adhesion (complete absence of lustrous areas along the incision) and the value of 5 to zero adhesion (the incised part, indeed even the peripheral coating, is completely pulled off).

EXAMPLE 1 (ACCORDING TO THE INVENTION)

Preparation of an Aqueous Dispersion of a Copolymer (C1) Composed of 4% by Weight of Monomer Units (m1) Derived from a Monomer (M1) which Carry —P(O)(OH)(OCH$_3$) Functional Groups 0.625 g of a homopolystyrene seed, 0.004 g of Dowfax® 2A1 surfactant, 2 g of methyl methacrylate and 29.4 g of demineralized water were introduced into a glass reactor which has an operating volume of 0.25 l, which is stirred and through which nitrogen bubbles. The temperature was brought to 80° C. and then 0.125 g of ammonium persulphate was introduced.

After reacting for 10 minutes (t0+10), a pre-emulsion in 28 g of water of 22 g of methyl methacrylate, of 1 g of monomer corresponding to the formula CH$_2$=C(CH$_3$)—CO—O—CH$_2$—PO(OH)(OCH$_3$) and of 0.375 g of Dowfax 2A1 surfactant was added dropwise over 3 hours.

An aqueous dispersion was thus obtained which is characterized by a level of solids of 23.8% and a size of the individual polymer particles of 165 nm.

The dispersion obtained was used without other purification.

EXAMPLE 2 (ACCORDING TO THE INVENTION)

Preparation of an Aqueous Dispersion of a Copolymer (C1) Composed of 8% by Weight of Monomer Units (m1) Derived from a Monomer (M1) which Carry —P(O)(OH)(OCH$_3$) Functional Groups 0.625 g of a homopolystyrene seed, 0.004 g of Dowfax 2A1 surfactant, 2 g of methyl methacrylate and 29.4 g of demineralized water were introduced into a glass reactor which has an operating volume of 0.25 l, which is stirred and through which nitrogen bubbles. The temperature was brought to 80° C. and then 0.125 g of ammonium persulphate was introduced.

After reacting for 10 minutes (t0+10), a pre-emulsion in 28 g of water of 21 g of methyl methacrylate, of 2 g of monomer corresponding to the formula CH$_2$=C(CH$_3$)—CO—O—CH$_2$—PO(OH)(OCH$_3$) and of 0.375 g of Dowfax 2A1 surfactant was added dropwise over 3 hours.

An aqueous dispersion was thus obtained which is characterized by a level of solids of 22.6% and a size of the individual polymer particles of 190 nm.

The dispersion obtained was used without other purification.

EXAMPLE 3 (ACCORDING TO THE INVENTION)

Preparation of an Aqueous Dispersion of a Copolymer (C1) Composed of 12% by Weight of Monomer Units (m1) Derived from a Monomer (M1) which Carry —P(O)(OH)(OCH$_3$) Functional Groups 0.625 g of a homopolystyrene seed, 0.004 g of Dowfax 2A1 surfactant, 2 g of methyl methacrylate and 29.4 g of demineralized water were introduced into a glass reactor which has an operating volume of 0.25 l, which is stirred and through which nitrogen bubbles. The temperature was brought to 80° C. and then 0.125 g of ammonium persulphate was introduced.

After reacting for 10 minutes (t0+10), a pre-emulsion in 28 g of water of 20 g of methyl methacrylate, of 3 g of monomer corresponding to the formula $CH_2=C(CH_3)—CO—O—CH_2—PO(OH)(OCH_3)$ and of 0.375 g of Dowfax 2A1 surfactant was added dropwise over 2 hours.

An aqueous dispersion was thus obtained which is characterized by a level of solids of 22.6% and a size of the individual polymer particles of 200 nm.

The dispersion obtained was used without other purification.

EXAMPLE 4 (ACCORDING TO THE INVENTION)

Preparation of an Aqueous Dispersion of a Copolymer (C1) Composed of 4% by Weight of Monomer Units (m1) Derived from a Monomer (M1) which Carry —P(O)(OH)$_2$ Functional Groups 0.625 g of a homopolystyrene seed, 0.004 g of Dowfax 2A1 surfactant, 2 g of methyl methacrylate and 29.4 g of demineralized water were introduced into a glass reactor which has an operating volume of 0.25 l, which stirred and through which nitrogen bubbles. The temperature was brought to 80° C. and then 0.125 g of ammonium persulphate was introduced.

After reacting for 10 minutes (t0+10), a pre-emulsion in 28 g of water of 22 g of methyl methacrylate, of 1 g of monomer corresponding to the formula $CH_2=C(CH_3)—CO—O—CH_2—PO(OH)_2$ and of 0.375 g of Dowfax 2A1 surfactant was added dropwise over 2 hours.

An aqueous dispersion was thus obtained which is characterized by a level of solids of 23% and a size of the individual polymer particles of 160 nm.

The dispersion obtained was used without other purification.

EXAMPLE 5 (COMPARATIVE)

Use of an Aqueous Dispersion Comprising a Vinylidene Chloride Polymer (P1) but not Copolymer (C1) in the Coating of a Metal Surface An aqueous dispersion of the commercial vinylidene chloride polymer Diofan® A602 was deposited on the metal support using a slot applicator. The aqueous dispersion was dried at ambient temperature without specific heat treatment. The low film-forming temperature of the dispersion made it possible to obtain a transparent cohesive film.

From the adhesion tests carried out 3 and 24 hours after the drying in accordance with the above description, it is apparent (see Table I below) that the vinylidene chloride polymer did not adhere at all to the metal support (adhesion >5). The cut surface was entirely removed by the adhesive and even the peripheral parts.

The same tests carried out 48 hours after the drying demonstrated a slight improvement in the adhesion (only the cut region was removed).

EXAMPLES 6 to 11 (ACCORDING TO THE INVENTION)

Preparation of Aqueous Dispersions Comprising a Vinylidene Chloride Polymer (P1) and a Copolymer (C1) Composed of 4 8 or 12% by Weight of Monomer Units (m1) Derived from a Monomer (M1) which Carried —P(O)(OH)(OCH$_3$) Functional Groups and their Use in the Coating of a Metal Surface The aqueous dispersion comprising a vinylidene chloride polymer used in Example 5 was mixed
a) with the aqueous dispersion comprising the copolymer (C1) prepared in Example 1 so that the % of copolymer (C1) in the final dispersion is 5, 10, 20 and 30% by weight with respect to the total weight of polymers in the aqueous dispersion (Examples 6 to 9),
b) with the aqueous dispersion comprising the copolymer (C1) prepared in Example 2so that the % of copolymer (C1) in the final dispersion is 5% by weight with respect to the total weight of polymers in the aqueous dispersion (Examples 10), and
c) with the aqueous dispersion comprising the copolymer (C1) prepared in Example 3 so that the % of copolymer (C1) in the final dispersion is 5% by weight with respect to the total weight of polymers in the aqueous dispersion (Examples 11).

The aqueous dispersions obtained were deposited on the metal support as described in Example 5.

The results observed during the performance of the adhesion test, in accordance with the above description, 3, 24 and 48 hours after the drying are shown in Table I below.

EXAMPLE 12 (ACCORDING TO THE INVENTION)

Preparation of an Aqueous Dispersion Comprising a Vinylidene Chloride Polymer (P1) and a Copolymer (C1) Composed of 4% by Weight of Monomer Units (m1) Derived from a Monomer (M1) which Carry —P(O)(OH)$_2$ Functional Groups and its Use in the Coating of a Metal Surface The aqueous dispersion comprising the vinylidene chloride polymer used in Example 5 was mixed with the aqueous dispersion comprising the copolymer (C1) prepared in Example 4so that the % of copolymer (C1) in the final dispersion is 5% by weight with respect to the total weight of polymers in the aqueous dispersion.

The aqueous dispersion obtained was deposited on the metal support as described in Example 5.

The results observed during the performance of the adhesion test, in accordance with the above description, 3, 24 and 48 hours after the drying are shown in Table I below.

TABLE I

| Example | % by weight of monomer units (m1) in the copolymer (C1) | % by weight of copolymer (C1) in the dispersion | Adhesion after 3 hours | Adhesion after 24 hours | Adhesion after 48 hours |
|---|---|---|---|---|---|
| 5 | / | / | >5 | >5 | 5 |
| 6 | 4 | 5 | >5 | 4 | 0 |
| 7 | 4 | 10 | >5 | 2 | 0 |
| 8 | 4 | 20 | >5 | 1 | 0 |
| 9 | 4 | 30 | 1 | 0 | 0 |

TABLE I-continued

| Example | % by weight of monomer units (m1) in the copolymer (C1) | % by weight of copolymer (C1) in the dispersion | Adhesion after 3 hours | Adhesion after 24 hours | Adhesion after 48 hours |
| --- | --- | --- | --- | --- | --- |
| 10 | 8 | 5 | >5 | 2 | 0 |
| 11 | 12 | 5 | 2 | 0 | 0 |
| 12 | 4 | 5 | 2 | 0 | 0 |

From the results presented in Table I, it is apparent that a significant improvement in the adhesion of the vinylidene chloride polymer to the metal surface was observed in the copolymer (C1) was present in the aqueous dispersion according to the invention (favourable change in the adhesion as a function of the time and particularly advantageous results after 48 hours), whether it carries —P(O)(OH)(OCH$_3$) or —P(O)(OH)$_2$ functional groups. For an identical amount of a copolymer (C1), the adhesion was, however, better when the latter carries —P(O)(OH)$_2$ functional groups.

EXAMPLE 13 (ACCORDING TO THE INVENTION)

Preparation of an Aqueous Dispersion of a Copolymer (C1) Composed of 11% by Weight of Monomer Units (m1) Derived from a Monomer (M1) which Carry —P(O)(OH)$_2$ Functional Groups A pre-emulsion was prepared in a round-bottomed flask with stirring from 23 g of demineralized water, 1.76 g of sodium hydroxide NaOH, 1.7 g of Disponil® FES 32 surfactant, 12 g of methyl methacrylate, 11 g of butyl acrylate and 3 g of the monomer corresponding to the formula

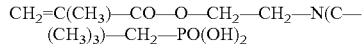

CH$_2$=C(CH$_3$)—CO—O—CH$_2$—CH$_2$—N(C—(CH$_3$)$_3$)—CH$_2$—PO(OH)$_2$ 0.82 g of Disponil FES 32 surfactant, 10% of the pre-emulsion and 15 g of demineralized water were introduced into a glass reactor which has an operating volume of 0.25 l, which is stirred and through which nitrogen bubbles. The temperature was brought to 80° C. and then 1.25 ml of an ammonium persulphate solution (26 g/l) were introduced.

After reacting for 15 minutes (t0+15), 40% of a pre-emulsion were added dropwise over 45 minutes.

At t0+1 h, 1.75 ml of a 26 g/l ammonium persulphate solution were introduced dropwise over 2 hours.

At t0+3h, the remaining 50% of pre-emulsion was introduced dropwise over 45 minutes.

At the end of the 4 hours of reaction, the temperature was increased to 85° C. for an additional 2 hours.

An aqueous dispersion was thus obtained which is characterized by a level of solid of 25.2% and a size of individual polymer particles of 80 nm.

The dispersion obtained was used without other purification.

EXAMPLE 14 (ACCORDING TO THE INVENTION)

Preparation of an Aqueous Dispersion of a Copolymer (C1) Composed of 16% by Weight of Monomer Units (m1) Derived from a Monomer (M1) which Carry —P(O)(OH)$_2$ Functional Groups 0.004 g of Dowfax 2A1 surfactant, 2 g of methyl methacrylate and 30 g of demineralized water were introduced into a glass reactor which has an operating volume of 0.25 l, which is stirred and through which nitrogen bubbles. The temperature was brought to 80° C. and then 0.125 g of ammonium persulphate was introduced.

After reaction for 15 minutes (t0+15), a pre-emulsion in 28 g of water of 20 g of methyl methacrylate, of 4 g of monomer corresponding to the formula CH$_2$=C(CH$_3$)—CO—O—CH$_2$—C(CH$_3$)(OH)—PO(OH)$_2$ and of 0.375 g of Dowfax 2A1 surfactant was added dropwise over 1 hour 20.

At t0+1 h 40, 0.25 ml of a 125 g/l ammonium persulphate solution was introduced, then again t0+2h20 and at t0+2h 40.

At t0+2h 15, 2.5 ml of a 50 g/l Dowfax solution were introduced.

An aqueous dispersion was thus obtained which is characterized by a level of solids of 22.2% and a size of the individual polymer particles of 220 nm.

The dispersion obtained was used without other purification.

EXAMPLE 15 (ACCORDING TO THE INVENTION)

Preparation of an Aqueous Dispersion of a Copolymer (C1) Composed of 23.6% by Weight of Monomer Units (m1) Derived from a Monomer (M1') which Carry —P(O)(OH)$_2$ Functional Groups a) Polymerization 50% by weight of toluene, 0.0366 mol of methyl methacrylate, 0.0045 mol of monomer corresponding to the formula CH$_2$=C(CH$_3$)—CO—O—CH$_2$—CH$_2$—NH—CO—O—(CH$_2$)$_2$—PO(OCH$_3$)$_2$ and 0.00041 mol of azobisisobutyronitrile (AIBN) were introduced into a reactor with stirring under a nitrogen atmosphere. The medium was subsequently brought to 70° C. for 14 h. The polymer was subsequently precipitated by addition of a nonsolvent.

The polymer obtained was characterized by a number-average molar mass $\overline{M}_n$ of 19 000 g.mol$^{-1}$ and a polydispersity index $I_p$ (ratio of the weight-average molar mass to the number-average molar mass) of 1.96. The number-average molar mass $\overline{M}_n$ and the polydispersity index $I_p$ were determined by steric exclusion chromatography on the dry samples of a system provided with a Waters pump equipped with 2×300 mm PL-Gel 5 µm mixed-C columns (Polymer Laboratories). Tetrahydrofuran (1 ml.min$^{-1}$) was used as eluent. The calibrations were carried out using polystyrene standard originating from Polymer Laboratories.

After drying the polymer, the latter was redissolved in dichloromethane and subjected to the action of bromotrimethylsilane for 12 h at ambient temperature and to the action of methanol in order to cleave (hydrolyse) the —PO(OCH$_3$)$_2$ groups to give —PO(OH)$_2$ groups.

b) Emulsification 6 g of the polymer obtained in stage a) were dissolved in 70 ml of chloroform in the presence of dodecylbenzenesulphonic acid. 140 ml of water, in which 0.09 g of an anionic emulsifier (alkylsulphonate) had been dissolved beforehand, were subsequently added to this solution. The combined mixture was emulsified at 20 500 rev/min for 30 min and then the chloroform was evaporated under vacuum, making it possible to obtain the copolymer (C1) in the form of an aqueous dispersion (level of solids 6.3% and size of the individual polymer particles 200 nm).

EXAMPLE 16 (ACCORDING TO THE INVENTION)

Preparation of an Aqueous Dispersion of a Copolymer (C1) Composed on 19% by Weight of Monomer Units (m1) Derived from a Monomer (M1') which Carry—P(O)(OH)$_2$ Functional Groups a) Polymerization 50% by weight of methyl ethyl ketone, 0.25 mol of methyl methacrylate, 0.0335 mol of monomer corresponding to the formula $CH_2=C(CH_3)-CO-O-NH-CO-O-(CH_2)_2-PO(OH)(OCH_3)$ and 0.00278 mol of AIBN were introduced into a reactor with stirring under a nitrogen atmosphere. The medium was brought to 70° C. for 14 h. The polymer was subsequently precipitated by addition of a non-solvent.

The polymer obtained has a number-average molar mass $\overline{M}_n$ of 21 200 g. mol$^{-1}$ and a polydispersity index $I_p$ of 2.2.

After drying the polymer, the latter was redissolved in dichloromethane and subjected to the action of bromotrimethylsilane for 12 h at ambient temperature and then to the action of methanol in order to cleave (hydrolyse) the —PO(OCH$_3$)$_2$ groups to give —PO(OH)$_2$ groups.

b) Emulsification 6 g of polymer were dissolved in 70 ml of chloroform in the presence of dodecylbenzenesulphonic acid. 140 ml of water, in which 0.09 g of an anionic emulsifier (alkylsulphonate) had been dissolved beforehand, was subsequently added to this solution. The combined mixture was emulsified at 20 500 rev/min for 30 min and then the chloroform was evaporated under vacuum, making it possible to obtain the polymer (C1) in the form of an aqueous dispersion (level of solids 6.3% and size of the individual polymer particles 200 nm).

EXAMPLES 17 to 20 (ACCORDING TO THE INVENTION)

Preparation of Aqueous Dispersions Comprising a Vinylidene Chloride Polymer (P1) and a Copolymer (C1) Composed of 10 or 12.8% by Weight of Monomer Units (m1) Derived from a Monomer (M1) or from a Monomer (M1') which Carry —P(O)(OH)$_2$ Functional Groups and their Use in the Coating of a Metal Surface The aqueous dispersion comprising the vinylidene chloride polymer used in Example 5 was mixed
a) with the aqueous dispersion comprising the copolymer (C1) prepared in Example 13 so that the % of copolymer (C1) in the final dispersion is 10% by weight with respect to the total weight of polymers in the dispersion (Example 17) (prior to this mixing, the pH of the aqueous dispersion of the copolymer (C1) was acidified with a hydrochloric acid solution (0.1 mol/l)),
b) with the aqueous dispersion comprising the copolymer (C1) prepared in Example 14 so that the % of copolymer (C1) in the final dispersion is 12.8% by weight with respect to the total weight of polymers in the dispersion (Example 18),
c) with the aqueous dispersion comprising the copolymer (C1) prepared in Example 15 so that the % of copolymer (C1) in the final dispersion is 10% by weight with respect to the total weight of polymers in the dispersion (Example 19), and
d) with the aqueous dispersion comprising the copolymer (C1) prepared in Example 16 so that the % of copolymer (C1) in the final dispersion is 10% by weight with respect to the total weight of polymers in the dispersion (Example 20).

The aqueous dispersions obtained were deposited on the metal support as described in Example 5.

The results observed during the performance of the adhesion test, in accordance with the above description, 3, 24 and 48 hours after the drying are shown in Table II below.

TABLE II

| Example | % by weight of monomer units (m1) in the copolymer (C1) | % by weight of copolymer (C1) in the dispersion | Adhesion after 24 hours |
|---|---|---|---|
| 17 | 11 | 10 | 0 |
| 18 | 16 | 12.8 | 2 |
| 19 | 23.6 | 10 | 2-3 |
| 20 | 19 | 10 | 3 |

EXAMPLE 21 (ACCORDING TO THE INVENTION)

Preparation of an Aqueous Dispersion of a Copolymer (C1) Composed of 4% by Weight of Monomer Units (m1) Derived from a Monomer (M1) which Carry —P(O)(OH)$_2$ Functional Groups 0.625 g of a homopolystyrene seed, 0.004 g of Dowfax 2A1 surfactant, 2 g of methyl methacrylate and 29.4 g of demineralized water were introduced into a glass reactor which has an operating volume of 0.25 l, which is stirred and through which nitrogen bubbles. The temperature was brought to 80° C. and then 0.125 g of ammonium persulphate was introduced.

After reacting for 10 minutes (t0+10), a pre-emulsion in 28 g of water of 22 g of methyl methacrylate, of 1 g of monomer corresponding to the formula $CH_2=CH-PO(OH)_2$ and of 0.375 g of Dowfax 2A1 surfactant was added dropwise over 2 hours.

An aqueous dispersion was obtained which is characterized by a level of solids of 24.7%.

The dispersion obtained was used without other purification.

EXAMPLES 22-24 (ACCORDING TO THE INVENTION)

Preparation of an Aqueous Dispersion Comprising a Vinylidene Chloride Polymer (P1) and a Copolymer (C1) Composed of 4% by Weight of Monomer Units (m1) Derived from a Monomer (M1) which Carry —P(O)(OH)$_2$ Functional Groups and their Use in the Coating of a Metal Surface The aqueous dispersion comprising the vinylidene chloride polymer used in Example 5 was mixed with the aqueous dispersion comprising copolymer (C1) prepared in Example 21 so that the % of copolymer (C1) in the final dispersion is 5, 10 and 20% by weight with respect to the total weight of polymers in the aqueous dispersion (Examples 22 to 24).

The aqueous dispersion obtained was deposited on the metal support as described in Example 5.

The results observed during the performance of the adhesion test, in accordance with the above description, 3 and 72 hours after the drying are shown in Table III below.

TABLE III

| Example | % by weight of monomer units (m1) in the copolymer (C1) | % by weight of copolymer (C1) in the dispersion | Adhesion after 3 hours | Adhesion after 72 hours |
|---|---|---|---|---|
| 22 | 4 | 5 | 5 | 0 |
| 23 | 4 | 10 | 2 | 0 |
| 24 | 4 | 20 | 2 | 1 |

The invention claimed is:

1. An aqueous dispersion comprising
  1) at least one vinylidene chloride polymer (P1) comprising vinylidene chloride in a proportion of at least 50% by weight, and
  2) at least one random, alternating or gradient copolymer (C1) comprising
    a) at least one monomer unit (m1) carrying at least one phosphonate group —PO(OH)(OR$_1$) with R$_1$ being a hydrogen atom or an alkyl radical comprising from 1 to 11 carbon atoms, and
    b) monomer units (m2) which represent at least 50% by weight of the copolymer (C1), derived from at least one monomer (M2) chosen from styrene, maleic anhydride, itaconic acid and monomers corresponding to the general formula:

CH$_2$=CR$_2$R$_3$ in which R$_2$ is chosen from hydrogen and the methyl radical and R$_3$ is chosen from the —CN radical and the —CO—R$_4$ radical in which R$_4$ is chosen from the —OH radical, the —O—R$_5$ radicals with R$_5$ chosen from the linear or branched alkyl radicals comprising from 1 to 18 carbon atoms which optionally carry one or more —OH radicals, the epoxyalkyl radicals comprising from 2 to 10 carbon atoms and the alkoxyalkyl radicals comprising a total of 2 to 10 carbon atoms and or R$_4$ is chosen from the —NR$_6$R$_7$ radicals in which R$_6$ and R$_7$, which are identical or different, are chosen from hydrogen and the alkyl radicals comprising from 1 to 10 carbon atoms which optionally carry one or more —OH radicals, wherein copolymer (C1) does not comprise monomer units derived from vinylidene chloride.

2. The aqueous dispersion according to claim 1, comprising just one vinylidene chloride polymer (P1) and just one random, alternating or gradient copolymer (C1).

3. The aqueous dispersion according to claim 1, wherein the vinylidene chloride polymer (P1) is prepared by an aqueous emulsion radical polymerization process.

4. The aqueous dispersion according to claim 1, wherein the monomer unit (m1) carrying at least one phosphonate group —PO(OH)(OR$_1$) is derived from an ethylenically unsaturated monomer (M1) chosen from the following monomers:

CH$_2$=CR$_{14}$—CO—O—(CH$_2$)$_i$—PO(OH)(OR$_1$) with R$_{14}$ being a hydrogen atom or a methyl radical and i between 1 and 20, CH$_2$=CR$_{14}$—CO—O—(CH$_2$)$_i$—O—CO—(CH$_2$)$_{10}$-PO(OH)(OR$_1$) with R$_{14}$ being a hydrogen atom or a methyl radical and i between 1 and 20, CH$_2$=CR$_{14}$—CO—O—CH$_2$—C(CH$_3$)(OH)—PO(OH)(OR$_1$) with R$_{14}$ being a hydrogen atom or a methyl radical, CH$_2$=CR$_{14}$—CO—O—NH—CO—O—(CH$_2$)$_i$—PO(OH)(OR$_1$) with R$_{14}$ being a hydrogen atom or a methyl radical and i between 1 and 20, CH$_2$=CR$_{14}$—CO—O—CH$_2$—CH$_2$—NH—CO—O—(CH$_2$)$_i$—PO(OH)(OR$_1$) with R$_{14}$ being a hydrogen atom or a methyl radical and i between 1 and 20, CH$_2$=CR$_{14}$—CO—O—(CH$_2$)$_i$—N(C—(CH$_3$)$_3$)—CH$_2$—PO(OH)(OR$_1$) with R$_{14}$ being a hydrogen atom or a methyl radical and i between 1 and 20, CH$_2$=CR$_{14}$—CO—O—(CH$_2$)$_i$—O—CO—(CH$_2$)$_{10}$—N(CH$_2$—PO(OH)(OR$_1$))$_2$ with R$_{14}$ being a hydrogen atom or a methyl radical and i between 1 and 20, CH$_2$=CR$_{14}$—CO—O—(CH$_2$)$_5$—N(CH$_2$—PO(OH)(OR$_1$))$_2$ with R$_{14}$ being a hydrogen atom or a methyl radical, CH$_2$=CR$_{14}$—C$_6$H$_4$—C(CH$_3$)$_2$—NH—CO—(CH$_2$)$_i$—PO(OH)(OR$_1$) with R$_{14}$ being a hydrogen atom or a methyl radical and i between 1 and 20, CH$_2$=CH—C$_6$H$_4$—CH$_2$—PO(OH)(OR$_1$) with the substitution of the aromatic nucleus being a mixture of ortho and para, CH$_2$=CH—PO(OH)(OR$_1$), and corresponding monomers (M1') carrying at least one —PO(OR$_{1'}$)(OR$_{2'}$) group with R$_{1'}$ and R$_{2'}$, which are identical or different, representing an alkyl radical comprising from 1 to 11 carbon atoms which, after total cleavage or partial cleavage, results in the phosphonate group —PO(OH)(OR$_1$) with R$_1$ being a hydrogen atom or an alkyl radical comprising from 1 to 11 carbon atoms.

5. The aqueous dispersion according to claim 1, wherein the monomer unit (m1) carrying at least one phosphonate group —PO(OH)(OR$_1$) is derived from an ethylenically unsaturated monomer (M1) chosen from the following monomers:

CH$_2$=C(CH$_3$)—CO—O—CH$_2$—PO(OH)(OR$_1$)

CH$_2$=C(CH$_3$)—CO—O—(CH$_2$)$_2$—PO(OH)(OR$_1$)

CH$_2$=C(CH$_3$)—CO—O—CH$_2$—C(CH$_3$)(OH)—PO(OH)(OR$_1$)

CH$_2$=C(CH$_3$)—CO—O—NH—CO—O—(CH$_2$)$_2$—PO(OH)(OR$_1$)

CH$_2$=C(CH$_3$)—CO—O—NH—CO—O—CH$_2$—PO(OH)(OR$_1$)

CH$_2$=C(CH$_3$)—CO—O—CH$_2$—CH$_2$—NH—CO—O—(CH$_2$)$_2$—PO(OH)(OR$_1$)

CH$_2$=C(CH$_3$)—CO—O—CH$_2$—CH$_2$—NH—CO—O—CH$_2$—PO(OH)(OR$_1$)

CH$_2$=C(CH$_3$)—CO—O—CH$_2$—CH$_2$—N(C—(CH$_3$)$_3$)—CH$_2$—PO(OH)(OR$_1$)

CH$_2$=C(CH$_3$)—CO—O—(CH$_2$)$_5$—N(CH$_2$—PO(OH)(OR$_1$))$_2$

CH$_2$=CH—PO(OH)(OR$_1$), and corresponding monomers (M1') carrying at least one —PO(OR$_{1'}$)(OR$_{2'}$) group with R$_{1'}$ and R$_{2'}$ identical and representing an alkyl radical comprising 1 or 2 carbon atoms which, after cleavage, results in the phosphonate group —PO(OH)(OR$_1$) with R$_1$ being a hydrogen atom or an alkyl radical comprising 1 or 2 carbon atoms.

6. The aqueous dispersion according to claim 1, wherein the monomer units (m1) of the copolymer (C1) represent at least 0.5% by weight and at most 50% by weight, with respect to the total weight of the monomer units in the copolymer (C1).

7. The aqueous dispersion according to claim 1, wherein the copolymer (C1) comprises monomer units (m2) which represent at least 50% by weight of the copolymer (C1), derived from at least one monomer (M2) chosen from maleic anhydride, itaconic acid and monomers corresponding to the general formula:

$$CH_2=CR_2R_3$$

in which $R_2$ is chosen from hydrogen and the methyl radical and $R_3$ is chosen from the —CN radical and the —CO—$R_4$ radical in which $R_4$ is chosen from the —OH radical and the —O—$R_5$ radicals with $R_5$ chosen from the linear or branched alkyl radicals comprising from 1 to 18 carbon atoms which optionally carry one or more —OH radicals and the epoxyalkyl radicals comprising from 2 to 10 carbon atoms.

8. The aqueous dispersion according to claim 1, wherein the monomer units (m2) of the copolymer (C1) represent at most 99.5% by weight of the copolymer (C1).

9. The aqueous dispersion according to claim 1, wherein the copolymer (C1) comprises
  a) monomer units (m1), in a proportion of at least 0.5% and of at most 50% by weight of the copolymer (C1), carrying at least one phosphonate group —PO(OH)(OR$_1$) and derived from an ethylenically unsaturated monomer (M1) chosen from the following monomers:
  CH$_2$=C(CH$_3$)—CO—O—CH$_2$—PO(OH)(OR$_1$)
  CH$_2$=C(CH$_3$)—CO—O—CH$_2$—C(CH$_3$)(OH)—PO(OH)(OR$_1$)
  CH$_2$=C(CH$_3$)—CO—O—NH—CO—O—(CH$_2$)$_2$—PO(OH)(OR$_1$)
  CH$_2$=C(CH$_3$)—CO—O—CH$_2$—CH$_2$—NH—CO—O—(CH$_2$)$_2$—PO(OH)(OR$_1$)
  CH$_2$=C(CH$_3$)—CO—O—CH$_2$—CH$_2$—N(C—(CH$_3$)$_3$)—CH$_2$—PO(OH)(OR$_1$)
  CH$_2$=CH—PO(OH)(OR$_1$), and
  corresponding monomers (M1') carrying at least one —PO(OR$_{1'}$)(OR$_{2'}$) group with R$_{1'}$ and R$_{2'}$ identical and representing an alkyl radical comprising 1 or 2 carbon atoms which, after cleavage, results in the phosphonate group —PO(OH)(OR$_1$) with R$_1$ being a hydrogen atom or an alkyl radical comprising 1 or 2 carbon atoms; and
  b) monomer units (m2), in a proportion of at least 50% by weight and of at most 99.5% by weight of the copolymer (C1), derived from at least one monomer (M2) chosen from maleic anhydride, itaconic acid, methyl methacrylate, methyl acrylate, ethyl methacrylate, ethyl acrylate, n-butyl methacrylate, n-butyl acrylate, 2-ethylhexyl methacrylate, 2-ethylhexyl acrylate, 2-hydroxyethyl methacrylate, 2-hydroxyethyl acrylate, glycidyl methacrylate, glycidyl acrylate, methacrylic acid and acrylic acid.

10. The aqueous dispersion according to claim 1, wherein the copolymer (C1) is prepared by an aqueous emulsion radical polymerization process or by a solution radical polymerization process in a solvent.

11. The aqueous dispersion according to claim 1, comprising at least 65% by weight of polymer (P1), with respect to the total weight of polymer (P1) and of copolymer (C1).

12. A process for the preparation of an aqueous dispersion according to claim 1, comprising the mixing of an aqueous dispersion of at least one vinylidene chloride polymer (P1) and of an aqueous dispersion of at least one random, alternating or gradient copolymer (C1).

13. A process for the coating of metal or polymer surfaces using the aqueous dispersion according to claim 1, according to which the aqueous dispersion is coated onto the said surfaces.

14. The aqueous dispersion according to claim 1, wherein copolymer (C1) consists of monomer units (m1) and (m2).

15. The aqueous dispersion according to claim 1, wherein said at least one vinylidene chloride polymer (P1) comprises vinylidene chloride in a proportion of 50 to 95% by weight.

16. The aqueous dispersion according to claim 1, wherein said at least one vinylidene chloride polymer (P1) comprises vinylidene chloride in a proportion of 60 to 95% by weight.

17. The aqueous dispersion according to claim 1, wherein said at least one vinylidene chloride polymer (P1) comprises vinylidene chloride in a proportion of 70 to 95% by weight.

* * * * *

UNITED STATES PATENT AND TRADEMARK OFFICE
CERTIFICATE OF CORRECTION

PATENT NO.          : 8,969,491 B2                              Page 1 of 1
APPLICATION NO.     : 12/089113
DATED               : March 3, 2015
INVENTOR(S)         : Christophe Fringant et al.

It is certified that error appears in the above-identified patent and that said Letters Patent is hereby corrected as shown below:

On the title page, item (75), second inventor, "Yves Vanderveken, Herverlee (BE);" should read --Yves Vanderveken, Heverlee (BE);--.

Claims

Column 21, line 47, Claim 1 "atoms and or finally $R_4$ is also chosen from the $-NR_6R_7$ radicals in" should read --atoms or finally $R_4$ is also chosen from the $-NR_6R_7$ radicals in--.

Column 22, line 23, Claim 4 "$CH_2=CR_{14}-C_6H_4-C(CH_3)_2-NH-CO-(CH_2)_i-$" should read --$CH_2=CR_{14}-C_6H_4-C(CH_3)_2-NH-CO-O-(CH_2)_i-$ --.

Column 24, line 34, Claim 15 "vinylidene chloride in a proportion of 50to 95 % by weight." should read --vinylidene chloride in a proportion of 50 to 95 % by weight.--.

Signed and Sealed this
Sixth Day of October, 2015

Michelle K. Lee
*Director of the United States Patent and Trademark Office*